(12) United States Patent
Adams

(10) Patent No.: US 7,144,549 B2
(45) Date of Patent: Dec. 5, 2006

(54) BIOCIDE IMPREGNATION OF COATINGS FOR ESP COMPONENTS

(75) Inventor: Dan L. Adams, Claremore, OK (US)

(73) Assignee: Baker Hughes Incorporated, Houston, TX (US)

(*) Notice: Subject to any disclaimer, the term of this patent is extended or adjusted under 35 U.S.C. 154(b) by 91 days.

(21) Appl. No.: 10/687,476

(22) Filed: Oct. 16, 2003

(65) Prior Publication Data
US 2004/0081578 A1 Apr. 29, 2004

Related U.S. Application Data

(62) Division of application No. 10/016,393, filed on Dec. 10, 2001, now abandoned.

(51) Int. Cl.
*B08B 17/00* (2006.01)
(52) U.S. Cl. ............ 422/6; 166/105; 166/105.1; 166/310; 166/902; 166/242.2; 422/1; 422/7; 422/14; 422/28

(58) Field of Classification Search ............ 422/1, 422/6, 7, 14, 28; 166/105, 105.1, 310, 902, 166/242.2
See application file for complete search history.

(56) References Cited

U.S. PATENT DOCUMENTS

| | | | | |
|---|---|---|---|---|
| 3,335,791 A | * | 8/1967 | Patton | 166/310 |
| 4,462,758 A | * | 7/1984 | Speed | 417/38 |
| 4,605,069 A | * | 8/1986 | McClaflin et al. | 166/310 |
| 5,783,117 A | * | 7/1998 | Byassee et al. | 261/29 |
| 6,138,750 A | * | 10/2000 | Ford | 166/53 |

* cited by examiner

Primary Examiner—Krisanne Jastrzab
(74) Attorney, Agent, or Firm—Bracewell & Giuliani LLP

(57) ABSTRACT

An electric submersible pump has one or more components coated with a biocide-incorporated coating for the purpose of controlling the activity of bacteria. The portions exposed to well fluid are coated for inhibiting bacteria from growing. Both centrifugal and progressing cavity pumps are applicable.

18 Claims, 3 Drawing Sheets

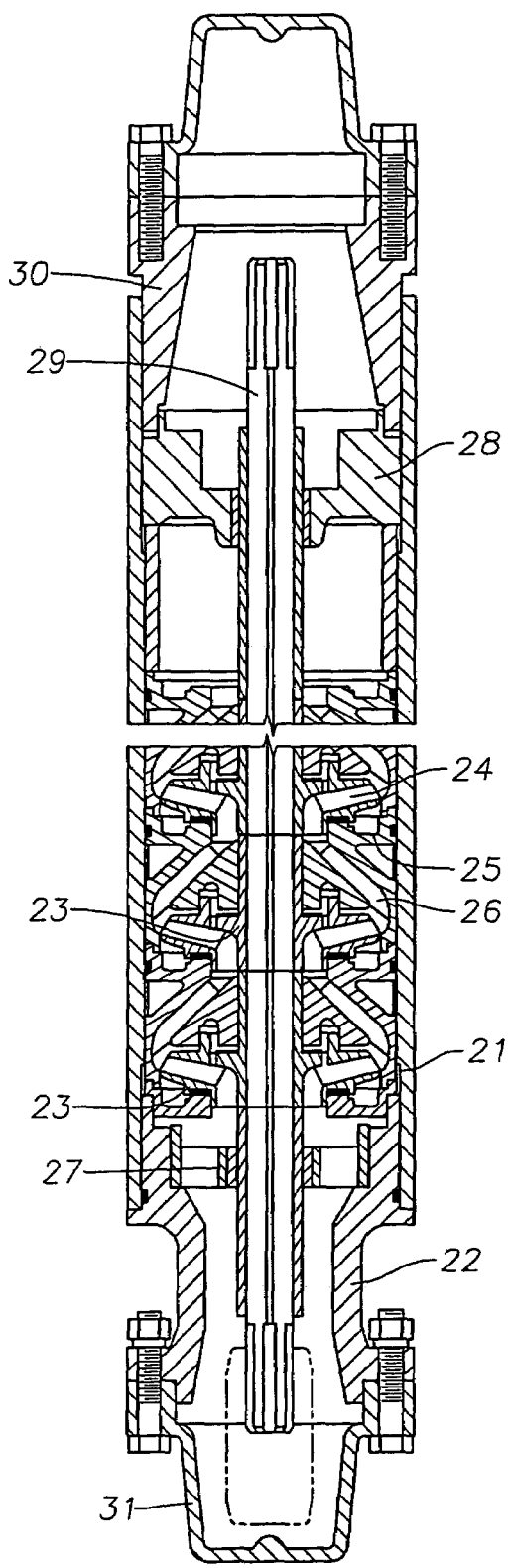
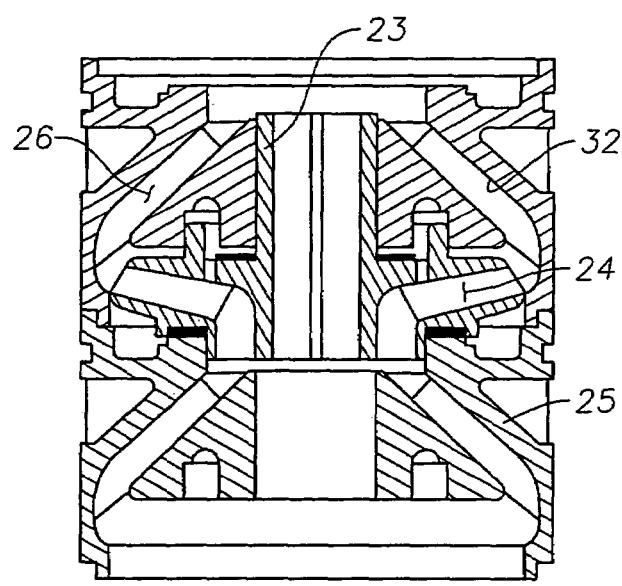
Fig. 2
Fig. 3

BIOCIDE IMPREGNATION OF COATINGS FOR ESP COMPONENTS

RELATED APPLICATIONS

This application is a divisional application of U.S. patent application Ser. No. 10/016,393, filed Dec. 10, 2001 now abandoned.

BACKGROUND OF THE INVENTION

1. Technical Field

The present invention generally relates to bacterial corrosion protection in electric submersible pump (ESP) industry. More specifically, the present invention relates to ESP with corrosion preventing coating as well as a method of reducing the content and inhibiting the growth and activity of bacteria, especially sessile bacteria such as sulfate reducing bacteria (SRB) in ESP components.

2. Description of the Related Art

Electrical submersible well pumps for deep wells are normally installed within casing on a string of tubing. Usually the tubing is made up of sections of pipe which are screwed together. The motor is supplied with power through a power cable that is strapped alongside the tubing. The pump is typically located above the motor and connected to the lower end of the tubing. The pump pumps fluid through the tubing to the surface. One type of a pump, a centrifugal pump, uses a large number of stages and is particularly suited for large pumping volume requirements.

For lesser pumping volume requirements, a progressing cavity or PC pump may be employed. PC pumps utilize a helical rotor that is rotated inside an elastomeric stator which has double helical cavities. PC pumps may be surface driven or bottom driven. Surface driven PC pumps have a rod which extends down to the pump in the well, whereas bottom driven PC pumps are driven by electric motors located in the well.

Water flooding is widely used in the petroleum industry to affect the recovery of oil. This process increases the total yield of oil present in a formation beyond what is usually recovered in the primary process. It is desirable in this process to maintain a high rate of water injection with a minimum expenditure of energy. Any impediment to the free entry of water to oil-bearing formations seriously reduces the efficiency of the recovery operation.

Water flooding systems provide an ideal environment for growth and proliferation of biofilms. Large amounts of water are transported through these systems and injected into oil bearing formations in an effort to maintain reservoir pressure or to increase the mobility of oil through the formation to producing wells. The large surface area of the water distribution network encourages biofouling, which is the attachment and growth of bacteria on the pipe walls.

Biofouling caused by anaerobic bacteria is compounded in water floods by the practice of removing oxygen from the water before injection. The removal of oxygen is done to minimize corrosion of equipment; however, the anoxic conditions provide an ideal environment for the growth of sulfate reducing bacteria (SRB) in the biofilms. This phenomenon is observed both on the injection side and producing side of the water flood operation. The metabolic activity of these bacteria can lead to accelerated corrosion rates, plugging of filters, health hazards from the sulfide production, and eventual souring of the formation (a sour well contains hydrogen sulfide).

A common method used to control biofouling in the art is regular application of a biocide. The biocide is generally selected based on its performance in a standard laboratory evaluation test. Glutaraldehyde (pentanedial), which is a highly effective quick-kill biocide, is commonly used to control biofouling. Usually, the biocide is added to the system periodically in predetermined dosage regimes. However, such commonly used method has some disadvantages: it requires large quantity and periodic addition of the biocide, which can increase the cost. Besides, glutaraldehyde is unstable on storage, if not stored properly.

Therefore, there is clearly a need for an improved method to protect electric submersible pump components from microbiologically induced corrosion with long-lasting effect.

SUMMARY OF THE INVENTION

It is therefore an object of the invention to provide an improved method to protect electric submersible pump (ESP) components from microbiologically induced corrosion.

Specifically, the invention discloses that one or more biocides can be included in coatings which are to be used on ESP stage sets and components to control the activity of bacteria, especially sessile bacteria such as sulfate reducing bacteria (SRB). Various components of ESP that can be coated with biocide-incorporated coatings include head and base of the centrifugal pump, or intake and discharge of the progressing cavity pump.

BRIEF DESCRIPTION OF THE DRAWINGS

FIG. 2 is a cross-sectional view the pump of FIG. 1

FIG. 3 is an enlarged cross-sectional view of a portion of the pump of FIG. 1.

DETAILED DESCRIPTION OF THE PREFERRED EMBODIMENT

Figure 1A:
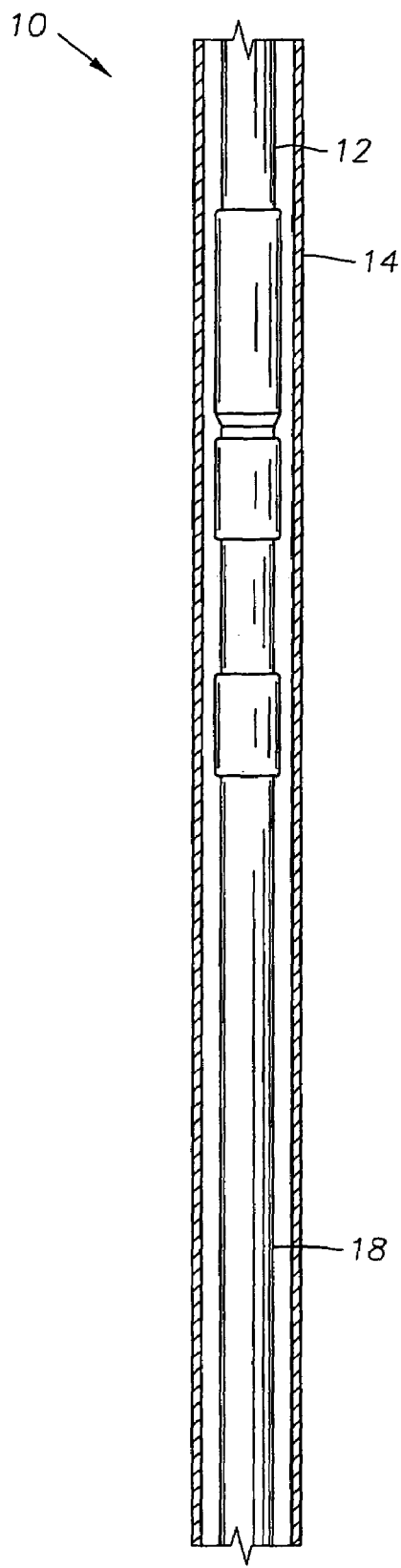
FIGS. 1A and 1B comprise an elevational view of an electrical submersible pump (ESP) assembly supported on tubing within casing in a well and having an internal coating in accordance with this invention.
Figure 1B:
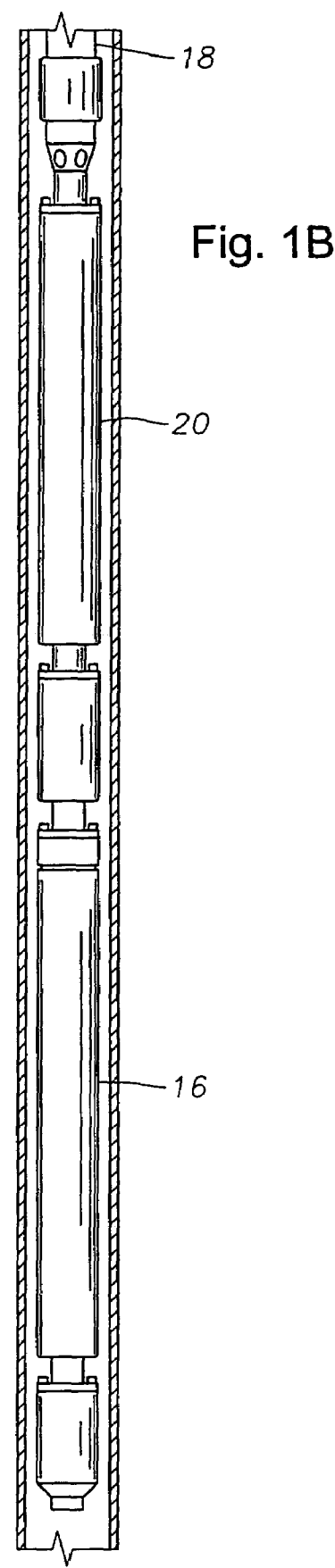

Referring now to FIGS. 1A and 1B, electrical submersible pump (ESP) assembly is designated generally 10. Usually, tubing 12 is run within casing 14 from the surface to provide a conduit to support ESP assembly 10 and carry produced fluids to ground surface. ESP assembly 10 includes a motor 16 that drives a pump 18. Motor 16 and pump 18 are typically separated by a seal section 20. Seal section 20 equalizes pressure of lubricant within motor 16 with that of the tubing annulus. Motor 16 is normally a three-phase electrical motor. Pump 18 is typically a centrifugal pump, although it might also be a progressing cavity pump.

Referring now to FIG. 2, pump 18 has a cylindrical housing 21. An adapter 22 on its lower end connects pump 18 to motor 16 (FIG. 1). A plurality of pump stages are located in housing 21. As shown also in FIG. 3, each stage has a impeller 23 with a plurality of passages 24 that lead upward and outward from a central inlet. Each impeller 23 fits within a diffuser 25, which has a plurality of passages 26 that lead inward and upward. A shaft 29 that is supported in housing 21 by radial bearings 27, 28, extends through each impeller 23 and diffuser 25. Impellers 23 are secured to shaft 29 by keys for rotation with shaft 29, while diffusers 25 are stationarily mounted in housing 21.

Shaft 29 is connected to another shaft (not shown) extending upward from seal section 20 (FIG. 1), which in turn is driven by motor 16. A discharge head 30 at the upper end of housing 21 connects pump 18 to tubing 12 (FIG. 1). Discharge head 30 has an internal passage for the discharge of well fluid into tubing 12. Caps 31 shown in FIG. 2 on discharge head 30 and adapter 22 are used only during transporting pump 18 and will be removed when pump 18 is to be installed in a well.

Biocide-incorporated coatings can be applied to various internal/external surfaces of pump 18. FIG. 3 illustrates biocide-incorporated coatings 32 formed on all surfaces that come into contact with the well fluid. This includes passages 24 of impeller 23 and passages 26 of diffusers 25, as well as exterior portions of impellers 23 and diffusers 25. Additionally such coatings 32 may be formed in the internal passages of adapter 22 and discharge head 30. Coatings 32 may also be formed on bearings 27, 28 and in the space in housing 21 above the upper pump stage and below upper bearing 28.

Figure 4A:
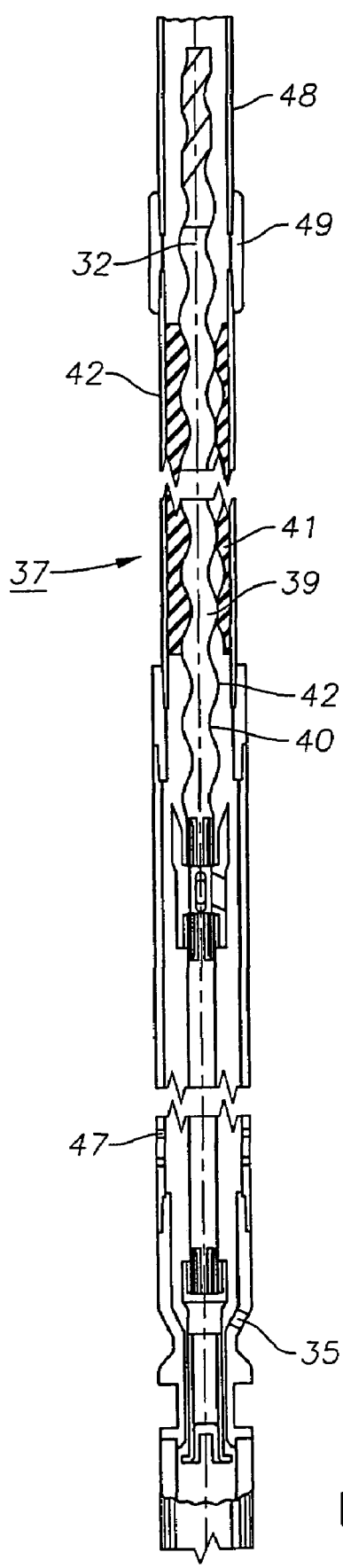
FIGS. 4A and 4B comprise a sectional side view of a progressing cavity (PC) pump on an upper end of a pump assembly showing intake ports and discharge of the pump, wherein the biocide-incorporating coating is applied in accordance with the invention.
Figure 4B:
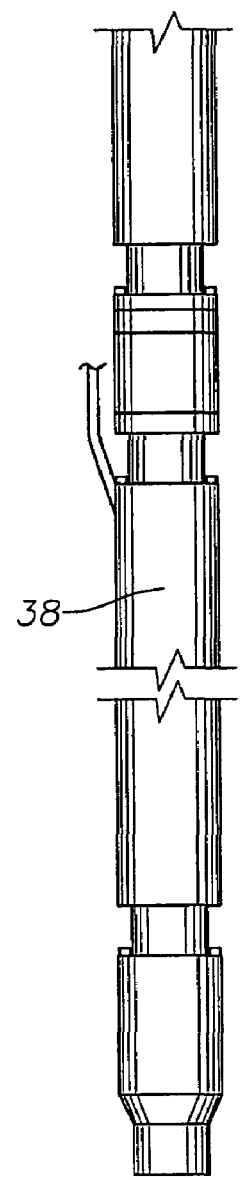

Referring now to FIGS. 4A and 4B, a progressing cavity (PC) pump 37 is driven by motor 38. PC pump 37 has a metal rotor 39 which has an exterior helical configuration and a splined lower end. Rotor 39 has undulations with small diameter portions 40 and large diameter portions 42 that give rotor 39 a curved profile relative to axis 32. Rotor 39 orbitally rotates within an elastomeric stator 41 which is located in pump housing 13. Stator 41 has double helical cavities located along axis 32 through which rotor 39 orbits. A housing 42 made of a plurality of tubular sections encloses stator 41 and rotor 39.

Specifically referring to FIG. 4A, a plurality of intake ports 47 are located in the lower portion of pump housing 42. The upper end of housing 42 is secured to a string of production tubing 48 by a coupling 49. Well fluid pumped by pump 37 is drawn in through intake ports 47 and 35 and discharged tubing 48. The internal portions of housing 42 that are exposed to well fluid may also have a biocide-incorporated coating. This includes both the intake portion and the discharge portion.

Examples of the biocides that have been used in the art to kill bacteria generally include various salts of metals, such as copper, arsenic, tin, lead, and zinc, as well as organic poisons. In addition to the above, bromine, glutaraldehyde, and possibly chlorine are the primary compounds to be used in accordance with the present invention. Other possible biocides include organic compounds, such as acrolein, formaldehyde, sodium dichlorophenol, acetate salts of coco amines, acetate salts of coco diamines, acetate salts of tallow diamines, alkyl amino, alkyl dimethyl ammonium chloride, alkyl phosphates, coco dimethyl ammonium chloride, paraformaldehyde, sodium salts of phenols, and substituted phenols, and inorganic compounds, such as sodium hydroxide, calcium sulfate.

The above mentioned biocides can be present in a dry and granular state before mixing with the liquid coatings. Alternatively, the biocides can be present in a liquid state in a microscopic time release capsule before mixing with the liquid coatings. After mixing, the coatings can be applied either by dipping or spraying (liquid or dry). For example, dry spraying would be electrostatic.

The invention has significant advantages. When biocides are incorporated in the coatings and then applied to the ESP components, no periodic addition of the biocides is needed. This may reduce the cost dramatically. Also, the incorporation of biocides in the coatings would prolong the life span of the biocides, especially for those that are not stable on storage, such as glutaraldehyde.

While the invention has been shown in only some of its forms, it should be apparent to those skilled in the art that it is not so limited but is susceptible to various changes without departing from the scope of the invention.

What is claimed is:

1. A method of inhibiting bacteria from growing in a submersible well pump, comprising the steps of:
   (a) incorporating one or more biocides in a coating;
   (b) applying the biocide-incorporated coating to the internal and/or external surfaces of one or more components of the pump; then
   (c) connecting an electrical motor to the pump and lowering the pump and the motor into the well; and
   (d) supplying electrical power to the motor to operate the pump, wherein bacterial growth is inhibited.

2. The method of claim 1, wherein step (a) comprises mixing the one or more biocides while in a dry state with the coating while in a liquid state.

3. The method of claim 1, wherein step (a) comprises mixing the one or more biocides while in a granular state with the coating while in a liquid state.

4. The method of claim 1, wherein step (a) comprises mixing the one or more biocides while in a liquid state with the coating while in a liquid state.

5. The method of claim 1, wherein the one or more biocides are in a microscopic time release capsule.

6. The method of claim 1, wherein step (b) comprises either by dipping or spraying the one or more components of the pump with the coating while in a liquid state.

7. The method of claim 1, wherein the biocide is selected from the group consisting of acrolein, formaldehyde, glutaraldehyde, sodium dichlorophenol, acetate salts of coco amines, acetate salts of coco diamines, acetate salts of tallow diamines, alkyl amino, alkyl dimethyl ammonium chloride, alkyl phosphates, coco dimethyl ammonium chloride, paraformaldehyde, sodium salts of phenols, and substituted phenols.

8. The method of claim 1, wherein the biocide is selected from the group consisting of bromine, chlorine, sodium hydroxide, calcium sulfate, and salts made from different metals.

9. The method of claim 6, wherein the metals include copper, arsenic, tin, lead and zinc.

10. A method of inhibiting bacteria from growing in a submersible well pump, comprising the steps of:
   (a) providing a pump with a housing and at least one rotary pump stage located therein, the pump stage having at least one passage for the flow of well fluid;
   (b) applying a coating to the passage with a substance having a biocide that controls the activity of bacteria; then
   (c) connecting an electrical motor to the pump and lowering the pump and the motor into the well; and
   (d) supplying electrical power to the motor to operate the pump to cause well fluid to flow through the passage of the pump stage and to the surface of the well, the well fluid flowing over the coating, thereby inhibiting bacterial growth.

11. The method of claim 10, wherein step (b) comprises either by dipping or spraying the pump stage with the coating while in a liquid state.

12. The method of claim 10, wherein the pump of step (a) comprises a centrifugal pump, the pump stage of step (a) comprises an impeller and a diffuser, and the at least one passage comprises an impeller passage and a diffuser passage; and step (b) comprises applying the coating to the impeller and the diffuser passages.

13. The method of claim 10, wherein the pump of step (a) comprises a progressing cavity pump.

14. A method of inhibiting method of inhibiting bacteria from growing in a submersible well pump, comprising the steps of:
  providing a centrifugal pump with a housing and a plurality of pump stages located therein, each of the pump stages having an impeller and a diffuser;
  applying a coating to at least portions of the impellers and diffusers with a substance that contains a biocide that controls the activity of bacteria; then
  connecting an electrical motor to the pump and lowering the pump and the motor into the well; and
  supplying electrical power to motor to cause the pump to rotate the impellers, causing well fluid to flow through the impellers and diffusers in contact with the coating to inhibit bacterial growth on the impellers and diffusers.

15. The method of claim 14, wherein the coating is applied either by dipping or spraying the impellers and the diffusers with the coating while in a liquid state.

16. The method of claim 14, wherein the biocide is selected from the group consisting of acrolein, formaldehyde, glutaraldehyde, sodium dichlorophenol, acetate salts of coco amines, acetate salts of coco diamines, acetate salts of tallow diamines, alkyl amino, alkyl dimethyl ammonium chloride, alkyl phosphates, coco dimethyl ammonium chloride, paraformaldehyde, sodium salts of phenols, and substituted phenols.

17. The method of claim 14, wherein the biocide is selected from the group consisting of bromine, chlorine, sodium hydroxide, calcium sulfate, and salts made from different metals.

18. The method of claim 17, wherein the metals include copper, arsenic, tin, lead and zinc.

* * * * *